US011518465B2

(12) United States Patent
Neuman et al.

(10) Patent No.: US 11,518,465 B2
(45) Date of Patent: Dec. 6, 2022

(54) MOTORCYCLE PROVIDING VISUAL LIGHT WARNING TO DETECTED VEHICLES TO NOTIFY DETECTED VEHICLES OF PRESENCE OF MOTORCYCLE

(71) Applicant: Gentex Corporation, Zeeland, MI (US)

(72) Inventors: George A. Neuman, Holland, MI (US); Dennis E. Vilcans, West Olive, MI (US); David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 346 days.

(21) Appl. No.: 16/826,671

(22) Filed: Mar. 23, 2020

(65) Prior Publication Data

US 2020/0307731 A1  Oct. 1, 2020

Related U.S. Application Data

(60) Provisional application No. 62/824,623, filed on Mar. 27, 2019.

(51) Int. Cl.
| | |
|---|---|
| *B62J 6/26* | (2020.01) |
| *B62J 45/41* | (2020.01) |
| *B62J 6/022* | (2020.01) |
| *B62J 6/04* | (2020.01) |

(52) U.S. Cl.
CPC .............. *B62J 6/26* (2020.02); *B62J 45/41* (2020.02); *B62J 6/022* (2020.02); *B62J 6/04* (2013.01)

(58) Field of Classification Search
CPC ...... B62J 6/022; B62J 6/04; B62J 6/26; F21S 41/657
See application file for complete search history.

(56) References Cited

U.S. PATENT DOCUMENTS

| | | | |
|---|---|---|---|
| 9,947,228 B1 | 4/2018 | Kim et al. | |
| 2005/0007579 A1* | 1/2005 | Stam ......................... | G01J 1/04 356/218 |
| 2006/0187009 A1* | 8/2006 | Kropinski ............. | G01S 15/931 342/70 |
| 2017/0259731 A1* | 9/2017 | Son ......................... | B60Q 1/30 |

(Continued)

FOREIGN PATENT DOCUMENTS

| | | | | |
|---|---|---|---|---|
| JP | 2016-187990 | * | 11/2016 | .............. B60S 1/603 |
| JP | 2017074820 | * | 4/2017 | .............. B60Q 1/346 |

(Continued)

*Primary Examiner* — Zheng Song
(74) *Attorney, Agent, or Firm* — Price Heneveld LLP; Brian James Brewer

(57) ABSTRACT

A motorcycle comprising: a lighting system including a plurality of lamps, each of which is configured to illuminate a different region of a plurality of regions relative to the motorcycle; one or more imaging assemblies, each of which includes an image sensor configured to generate image data; and a controller in communication with each of the plurality of lamps that receives as input the image data that the image sensor from each of the one or more imaging assemblies generates, analyzes the image data, detects a vehicle from the image data, and activates whichever lamp of the plurality of lamps that illuminates the region of the plurality of regions that is closest to the vehicle to provide a visual warning to the vehicle of the motorcycle.

20 Claims, 10 Drawing Sheets

(56) References Cited

U.S. PATENT DOCUMENTS

| | | | | |
|---|---|---|---|---|
| 2018/0229649 A1* | 8/2018 | Salter | ................... | B60Q 1/486 |
| 2018/0231206 A1* | 8/2018 | Hara | ................... | F21S 45/10 |
| 2019/0193626 A1* | 6/2019 | Park | ................... | B60Q 1/535 |
| 2020/0017164 A1* | 1/2020 | Saeki | ................... | B62J 6/05 |
| 2020/0070389 A1* | 3/2020 | Tseng | ................ | B29C 45/0005 |
| 2021/0078487 A1* | 3/2021 | Bader | ................ | H05B 47/115 |
| 2021/0188153 A1* | 6/2021 | Helot | ................ | B60Q 1/2696 |

FOREIGN PATENT DOCUMENTS

| | | | | |
|---|---|---|---|---|
| JP | WO 2019082615 | * | 5/2019 | ............. B60Q 1/26 |
| TW | 200626407 A | | 8/2006 | |
| TW | M521581 U | | 5/2016 | |

* cited by examiner

MOTORCYCLE PROVIDING VISUAL LIGHT WARNING TO DETECTED VEHICLES TO NOTIFY DETECTED VEHICLES OF PRESENCE OF MOTORCYCLE

CROSS-REFERENCE TO RELATED APPLICATION

This application claims priority to and the benefit under 35 U.S.C. § 119(e) of U.S. Provisional Application No. 62/824,623, filed on Mar. 27, 2019, entitled "MOTORCYCLE PROVIDING VISUAL LIGHT WARNING TO DETECTED VEHICLES TO NOTIFY DETECTED VEHICLES OF PRESENCE OF MOTORCYCLE," the disclosure of which is hereby incorporated herein by reference in its entirety.

FIELD OF THE DISCLOSURE

The present disclosure generally relates to a motorcycle, and more particularly to a motorcycle with one or more lamps emitting light toward a nearby vehicle detected through image analysis to provide visual warning to the nearby vehicle that the motorcycle is nearby.

BACKGROUND

Operators of vehicles driving near a motorcycle sometimes do not notice that the motorcycle is present. In a highway traffic scenario, an operator of a vehicle may veer towards the motorcycle while attempting to change lanes, potentially contacting the motorcycle. In another scenario, an operator of a vehicle in a driveway may back out or pull out of the driveway while the motorcycle is driving towards the driveway on a street adjacent to the driveway, again potentially contacting the motorcycle.

SUMMARY OF THE DISCLOSURE

The present disclosure solves that problem by capturing image data of an external environment near the motorcycle using an imaging assembly on the motorcycle, analyzing the image data with a controller to determine whether a vehicle is near the motorcycle, and causing a lamp to emit light toward the vehicle to provide a visual warning to the operator of the vehicle that the motorcycle is present. The visual warning increases the likelihood that the operator of the vehicle will notice the motorcycle before directing the vehicle toward the motorcycle in a potentially unsafe manner.

According to one aspect of the present disclosure, a motorcycle comprises: a lighting system including a plurality of lamps, each of which is configured to illuminate a different region of a plurality of regions relative to the motorcycle; one or more imaging assemblies, each of which includes an image sensor configured to generate image data; and a controller in communication with each of the plurality of lamps that receives as input the image data that the image sensor from each of the one or more imaging assemblies generates, analyzes the image data, detects a vehicle from the image data, and activates whichever lamp of the plurality of lamps that illuminates the region of the plurality of regions that is closest to the vehicle to provide a visual warning to the vehicle of the motorcycle.

In embodiments, the plurality of lamps comprises: a forward-right lamp configured to illuminate a forward-right region that is forward and to the right of the motorcycle; a forward-left lamp configured to illuminate a forward-left region that is forward and to the left of the motorcycle; a rearward-right lamp configured to illuminate a rearward-right region that is rearward and to the right of the motorcycle; and a rearward-left lamp configured to illuminate a rearward-left region that is rearward and to the left of the motorcycle.

In embodiments, the one or more imaging assemblies includes: a forward imaging assembly with a field of view that is generally forward of the motorcycle; and a rearward imaging assembly with a field of view that is generally rearward of the motorcycle.

In embodiments, the controller analyzes the image data from the image sensor of the forward imaging assembly, detects the vehicle from the image data, and activates whichever of the forward-left lamp or the forward-right lamp that illuminates the region of the plurality of regions that is closest to the vehicle. In embodiments, the controller analyzes the image data from the image sensor of the rearward imaging assembly, detects the vehicle from the image data, and activates whichever of the rearward-right lamp or the rearward-left lamp that illuminates the region of the plurality of regions that is closest to the vehicle.

In embodiments, the controller analyzes the image data and detects the vehicle from the image data using an image processing algorithm that identifies a signature of a light emission from a headlight or a taillight of the vehicle. In embodiments, the controller analyzes the image data from the forward imaging assembly and detects the vehicle from the image data using the image processing algorithm that identifies the signature of the light emission from the taillight of the vehicle, and activates whichever of the forward-left lamp or the forward-right lamp that illuminates the region of the plurality of regions that is closest to the vehicle. In embodiments, the controller analyzes the image data from the rearward imaging assembly and detects the vehicle from the image data using the image processing algorithm that identifies the signature of the light emission from the headlight of the vehicle, and activates whichever of the rearward-right lamp or the rearward-left lamp illuminates the region of the plurality of regions closest to the vehicle.

In embodiments, the image sensor includes a pixel array with X-Y coordinates. In embodiments, the controller further determines a position of the vehicle relative to the motorcycle by determining the X-Y coordinates of the vehicle on the pixel array.

In embodiments, the controller causes the lamp of the plurality of lamps to emit light continuously or in a blinking manner during a period of time while the controller detects the vehicle and the region of the plurality of regions that the lamp illuminates is the region of the plurality of regions that is closest to the vehicle. In embodiments, the controller determines that the vehicle is veering toward the motorcycle and causes the lamp to illuminate the region in a blinking manner. In embodiments, the controller determines that the vehicle is veering toward the motorcycle by identifying a pixel shift in the X-Y coordinates of the vehicle on the pixel array over a plurality of image frames, and causes the lamp to illuminate the region in a blinking manner.

According to another aspect of the present disclosure, a motorcycle comprises: a midline; a lighting system including a lamp that is positionable to emit light from an angular position within a range of angular positions relative to the midline of the motorcycle; an imaging assembly including an image sensor configured to generate image data, and having a field of view that encompasses the range of angular positions from which the lamp can be positioned to emit light; and a controller in communication with the lamp that receives as input the image data that the image sensor of the imaging assembly generates, analyzes the image data, detects a vehicle from the image data, and activates the lamp and adjusts the angular position of the lamp to emit the light toward the vehicle to provide a visual warning to the vehicle of the motorcycle.

In embodiments, the image sensor includes a pixel array with X-Y coordinates and a centerline extending from a base pixel through the pixel array. In embodiments, the controller further determines the X-Y coordinates of the vehicle on the pixel array, determines an angular deviation of the vehicle from the centerline of the pixel array, and adjusts the angular position of the lamp relative to the midline of the motorcycle to match the angular deviation of the vehicle from the centerline of the pixel array.

In embodiments, the lamp is positionable to emit the light rearward of the motorcycle. In embodiments, the motorcycle further comprises a rearward lamp of the lighting system that is positionable to emit light rearward of the motorcycle and from an angular position within a range of angular positions relative to the midline of the motorcycle. In embodiments, the field of view of the imaging assembly is rearward of the motorcycle. In embodiments, the motorcycle further comprises a rearward imaging assembly including an image sensor configured to generate image data, and having a field of view that is rearward of the motorcycle and encompasses the range of angular positions from which the rearward lamp can be positioned to emit light, the image sensor of the rearward imaging assembly including a pixel array with X-Y coordinates and a centerline extending from a base pixel through the pixel array. In embodiments, the controller analyzes the image data and detects the vehicle with an image processing algorithm that identifies a signature of a light emission from a headlight of the vehicle that is rearward of the motorcycle, with the X-Y coordinates of the light emission from the headlight being the X-Y coordinates of the vehicle. In embodiments, the controller (i) is in further communication with the rearward lamp, (ii) receives as input the image data that the image sensor of the rearward imaging assembly generates, (iii) analyzes the image data from the image sensor of the rearward imaging assembly, (iv) detects a rearward vehicle from the image data with an image processing algorithm that identifies a signature of a light emission from a headlight of the rearward vehicle, (v) determines the X-Y coordinates of the rearward vehicle on the pixel array of the image sensor of the rearward imaging assembly, with the X-Y coordinates of the light emission from the headlight being the X-Y coordinates of the rearward vehicle, (vi) determines an angular deviation of the rearward vehicle from the centerline of the pixel array of the image sensor of the rearward imaging assembly, (vii) adjusts the angular position of the rearward lamp to match the angular deviation of the rearward vehicle from the centerline of the pixel array of the image sensor of the rearward imaging assembly, and (viii) activates the rearward lamp to emit the light toward the rearward vehicle to provide a visual warning to the rearward vehicle of the motorcycle.

In embodiments, the lamp is positionable to emit light forward of the motorcycle. In embodiments, the field of view of the imaging assembly is forward of the motorcycle. In embodiments, the controller analyzes the image data and detects the vehicle with an image processing algorithm that identifies a signature of a light emission from a taillight of the vehicle that is forward of the motorcycle, with the X-Y coordinates of the light emission from the taillight being the X-Y coordinates of the vehicle.

In embodiments, the controller continuously analyzes the image data, and continuously adjusts the angular position of the lamp as a function of the image data while the controller detects the vehicle from the image data, so that the emitted light from the lamp stays directed toward the vehicle. In embodiments, the controller causes the lamp to emit light in a blinking manner if the controller determines that the vehicle is moving closer to the motorcycle by identifying a pixel shift in the X-Y coordinates of the vehicle over a plurality of image frames.

In embodiments, the controller analyzes the image data with a convolutional neural network machine-learned image recognition algorithm to detect the vehicle and location of the vehicle relative to the motorcycle.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 9 is a hypothetical field of view and image frame of the forward imaging assembly of FIG. 1, illustrating a vehicle on a right side of the field of view in a driveway adjacent to a road that the motorcycle is on.

DETAILED DESCRIPTION

Figure 1:
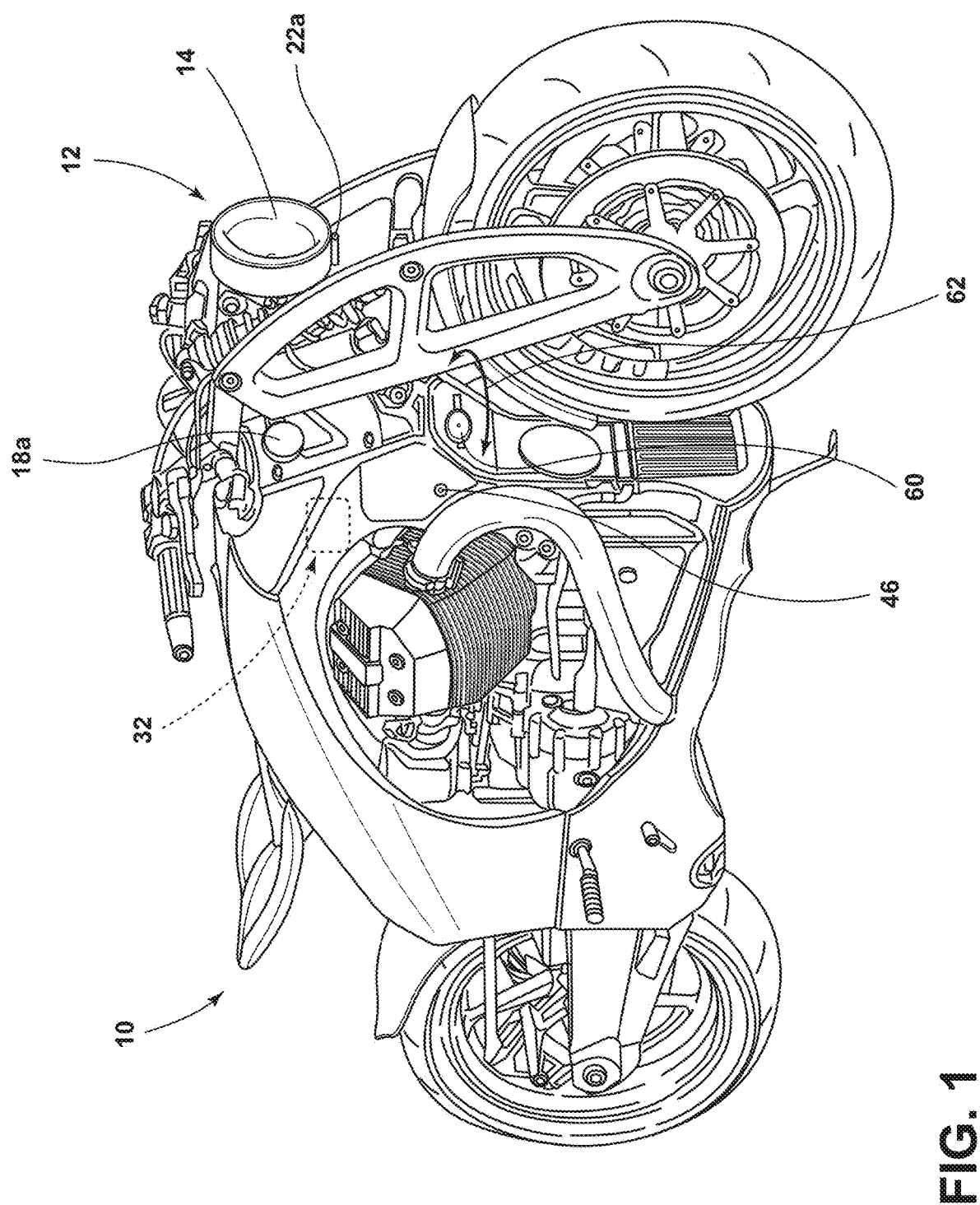
FIG. 1 is a front perspective view of a motorcycle, illustrating a lighting system including a forward-right lamp that is fixed and a forward lamp that is positionable to emit light forward of the motorcycle, a forward imaging assembly to capture images forward of the motorcycle, and a controller that controls the lighting system based on image data from the forward imaging assembly in order to provide a visual warning to a vehicle near the motorcycle.

The present illustrated embodiments reside primarily in combinations of method steps and apparatus components related to a motorcycle 10 with a lighting system 12 providing visual warning to vehicles 40 detected through image analysis that the motorcycle 10 is nearby. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

It is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
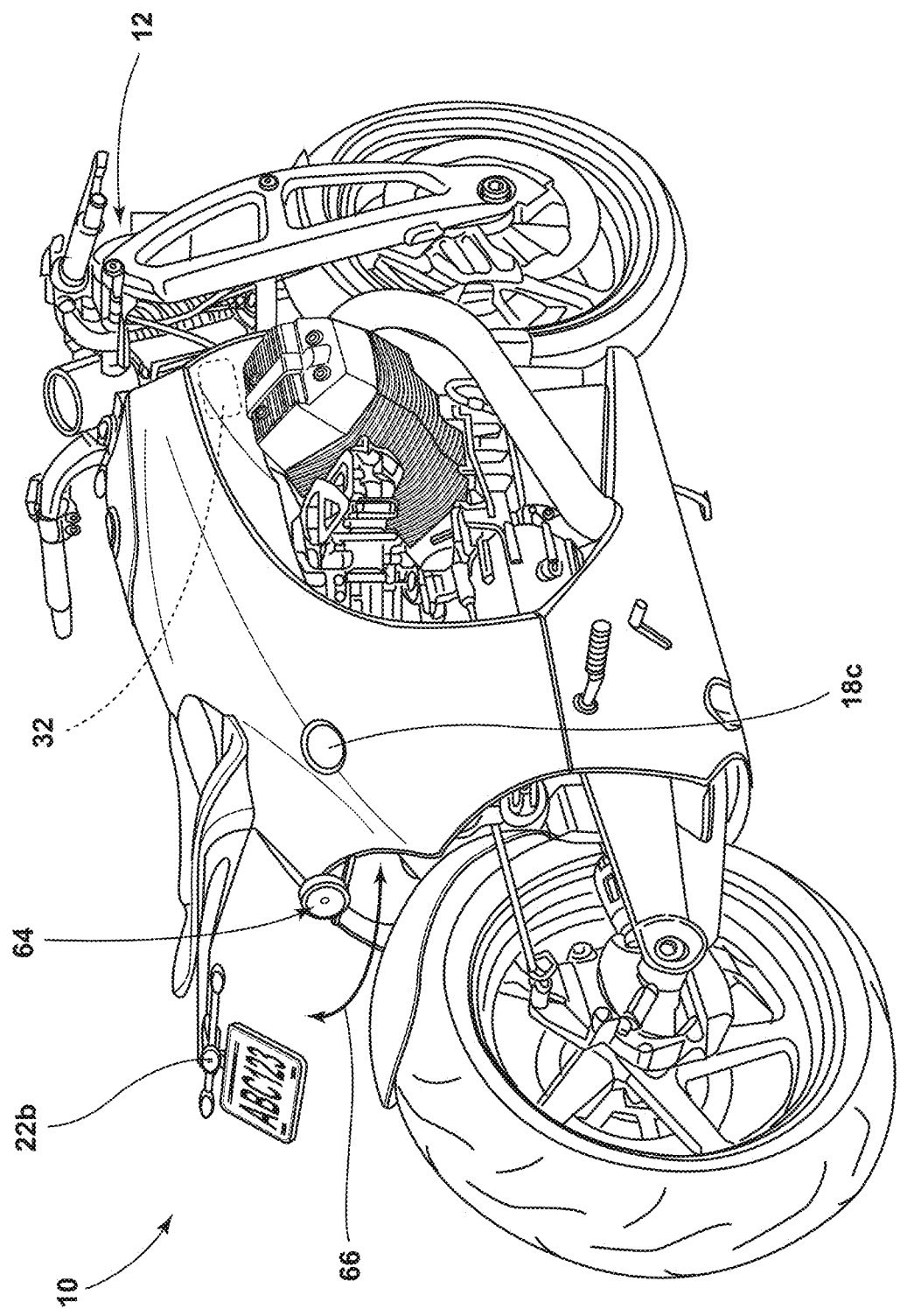
FIG. 2 is a rear perspective view of the motorcycle of FIG. 1, illustrating the lighting system further including a rearward-right lamp that is fixed and a rearward positionable lamp, and a rearward imaging assembly to capture images rearward of the motorcycle.
Figure 3:
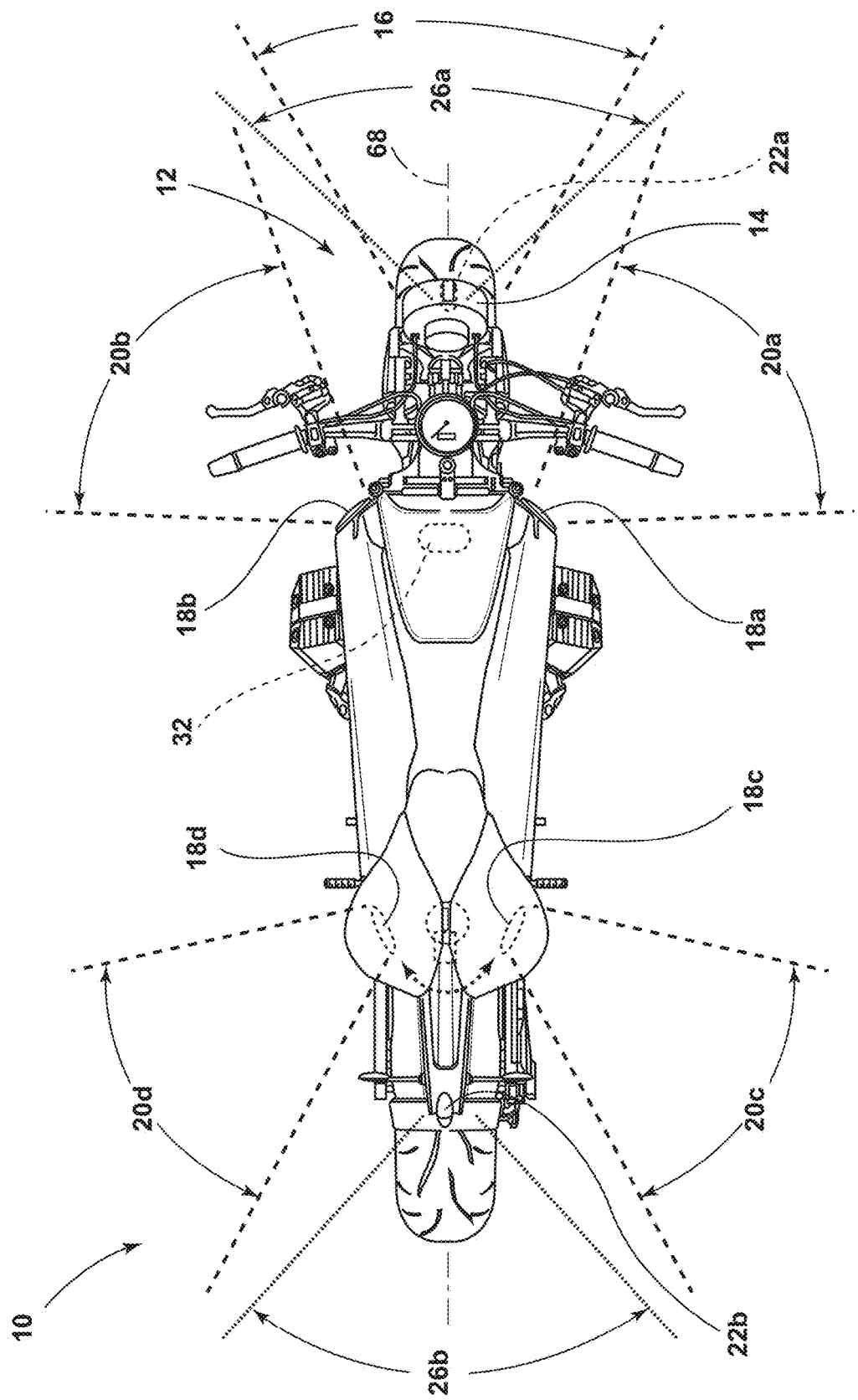
FIG. 3 is an overhead view of the motorcycle of FIG. 1, illustrating the lighting system with additional lamps including a forward-left lamp and a rearward-left lamp that are fixed, each positioned to illuminate different regions relative to the motorcycle, the forward imaging assembly having a field of view that is generally forward of the motorcycle, and the rearward imaging assembly having a field of view that is generally rearward of the motorcycle.

Referring to FIGS. 1-3, a motorcycle 10 includes a lighting system 12. The lighting system 12 can include a headlight 14. The headlight 14 is configured to illuminate a forward region 16 relative to the motorcycle 10. The lighting system 12 further includes a plurality of lamps 18a-18d to illuminate a plurality of regions 20a-20d relative to the motorcycle 10. For example, the illustrated embodiment includes: (i) a forward-right lamp 18a configured to illuminate the region 20a forward and to the right of the motorcycle 10; (ii) a forward-left lamp 18b configured to illuminate the region 20b forward and to the left of the motorcycle 10; (iii) a rearward-right lamp 18c configured to illuminate the region 20c rearward and to the right of the motorcycle 10; and (iv) the rearward-left lamp 18d configured to illuminate the region 20d rearward and to the left of the motorcycle 10. In some embodiments, some of the regions 20 may overlap. The lighting system 12 can include less or more lamps 18 configured to illuminate additional or different regions 20 relative to the motorcycle 10. In the illustrated embodiment, the lamps 18a-18d are fixed in position to illuminate regions 20a-20d that are approximately diagonally away from the motorcycle 10 and toward potential blind spot areas of nearby vehicles 40. The motorcycle 10 further includes a midline 68. A forward-to-rearward vertical plane extends through the midline 68 and conceptually divides the motorcycle into two approximately symmetrical halves.

The motorcycle 10 further includes one or more imaging assemblies 22. In the illustrated embodiment, the one or more imaging assemblies 22 include a forward imaging assembly 22a and a rearward imaging assembly 22b, each of which includes an image sensor 24 (FIG. 4) that is configured to generate image data. Both the forward imaging assembly 22a and the rearward imaging assembly 22b direct light onto their respective image sensor 24. The forward imaging assembly 22a is forward directed. The rearward imaging assembly 22b is rearward directed. Each image sensor 24, when powered, generates and outputs image data. The image data corresponds to a field of view 26a, 26b captured by the image sensors 24, respectively. The field of view 26a is generally forward of the motorcycle 10. The field of view 26b is generally rearward of the motorcycle 10. In other words, the forward imaging assembly 22a has a field of view 26a that is generally forward of the motorcycle, and the rearward imaging assembly 22b has a field of view 26b that is generally rearward of the motorcycle. In some embodiments, the motorcycle 10 includes only the forward imaging assembly 22a or the rearward imaging assembly 22b. In other embodiments, the motorcycle 10 includes additional or differently directed imaging assemblies 22, such as imaging assemblies 22 with field of views 26 generally matching the regions 20 of illumination of the plurality of lamps 18. Example image sensors include a complementary metal oxide semiconductor (CMOS) image sensor, for example a CMOS active-pixel sensor (APS) or a charge coupled device (CCD).

Figure 4:
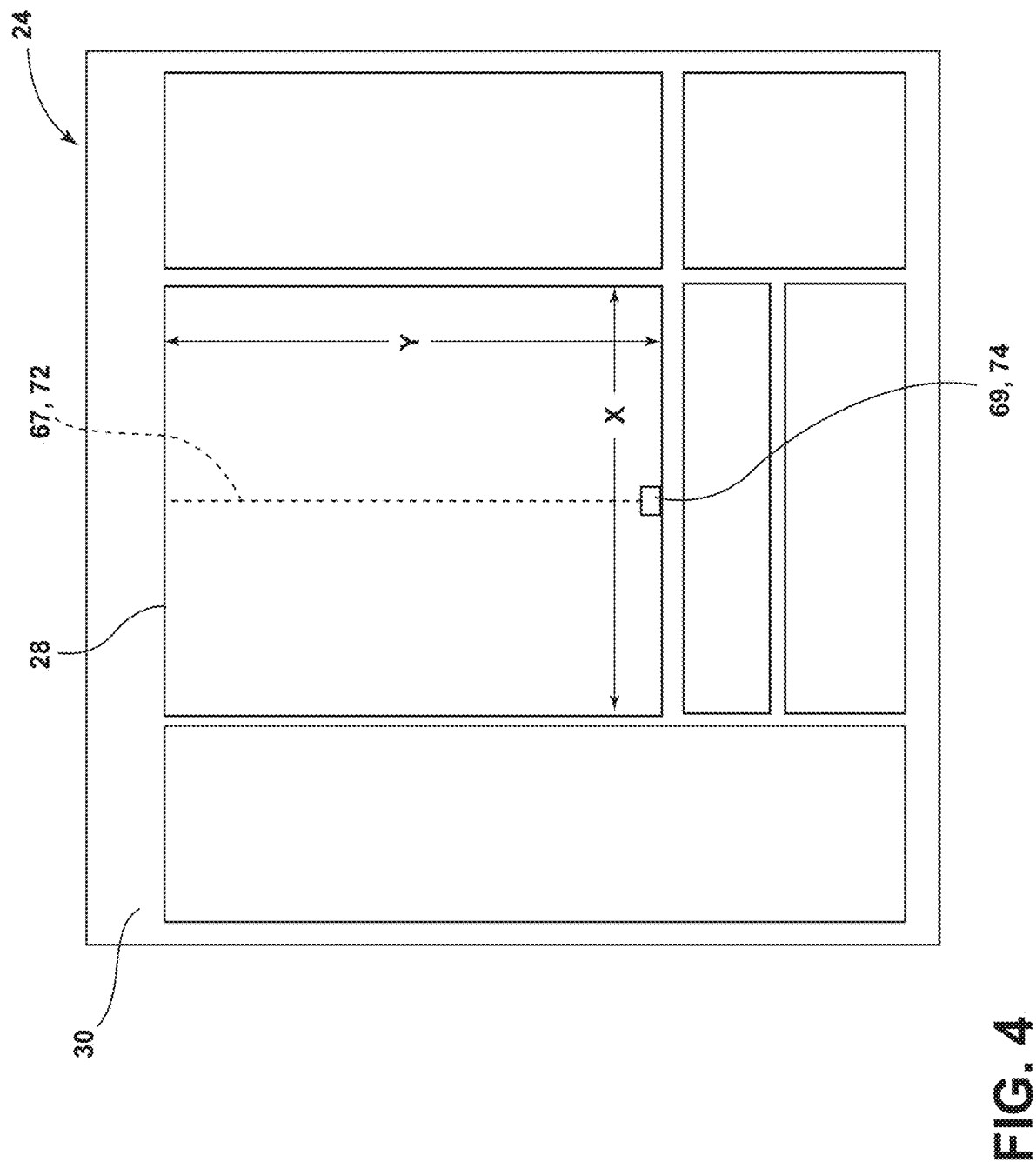
FIG. 4 is a very simplified schematic diagram of an image sensor, which both the forward imaging assembly and the rearward imaging assembly separately include, illustrating the image sensor having a pixel array of pixels, including a base pixel, arranged in an X-Y coordinate grid arrangement having a centerline from the base pixel roughly dividing the pixel array into two halves.

Referring now to FIG. 4, which is a simplified illustration, each image sensor 24 includes a pixel array 28 on a circuit board 30. Each of the pixels of the pixel array 28 may correspond to a photo-sensor, an array of photo-sensors, or any grouping of sensors configured to capture light. The pixel array 28 can be arranged in an X-Y grid, such as a grid of 3840 pixels in the X-direction and 2160 pixels in the Y-direction, from which X-Y coordinates of a pixel or grouping of pixels can be determined. The image sensor 24 may output data in either analog or digital form. In addition to the pixel array 28, the image sensor 24 can include various circuits, converters, amplifiers, among other things, as known in the art.

Figure 5:
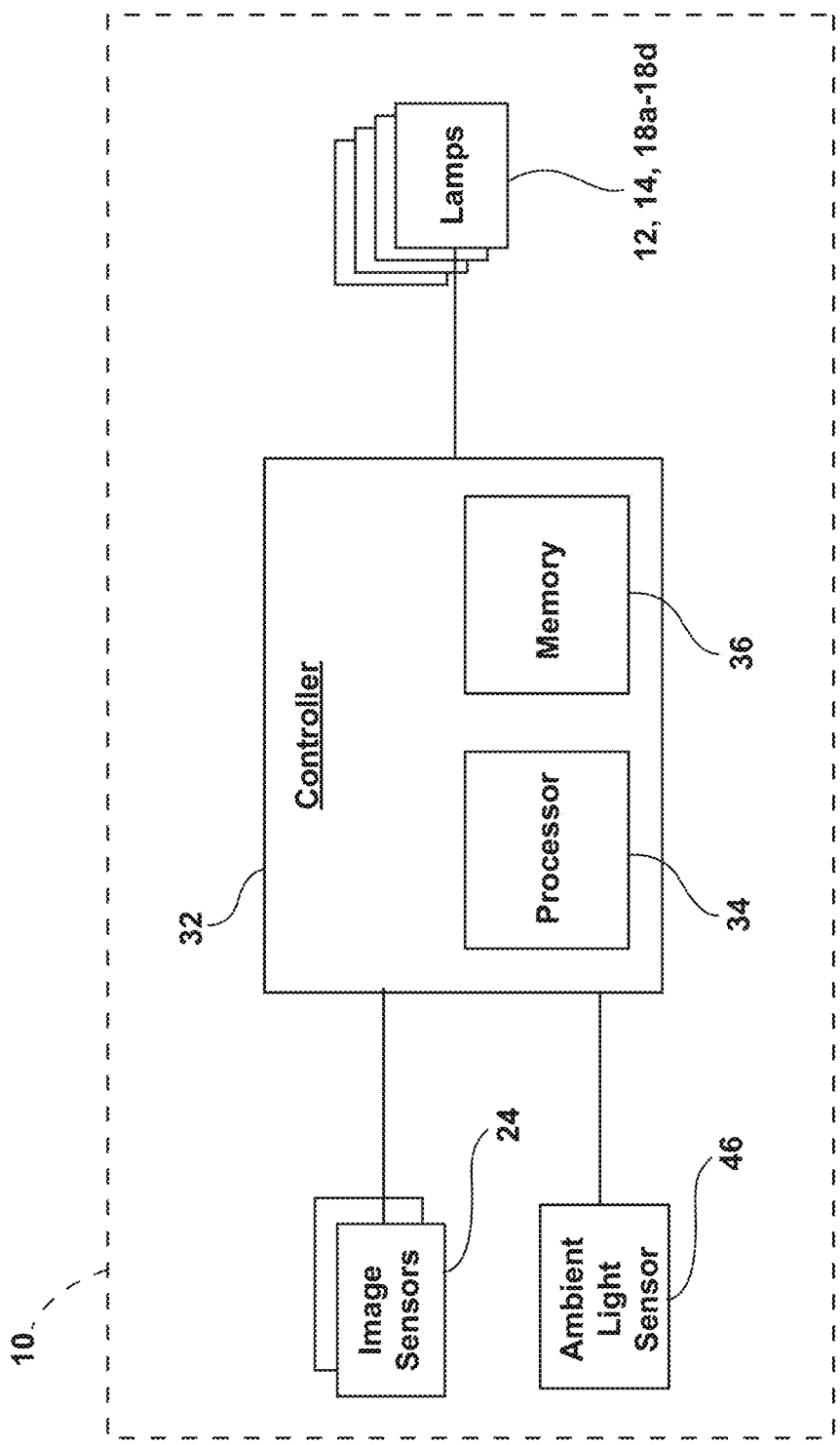
FIG. 5 is a schematic diagram of the controller of FIG. 1, illustrating the controller controlling the lamps of the lighting system as a function of image data input provided by the imaging assemblies.

Referring now additionally to FIG. 5, the motorcycle 10 further includes a controller 32. The controller 32 receives as input the image data that the image sensors 24 generate. The controller 32 includes a processor 34 that processes the image data that the image sensors 24 generate. The processor 34 can be a plurality of processors, a multicore processor, or any combination of processors, circuits, and peripheral processing devices. The controller 32 further includes memory 36. The memory 36 may correspond to various forms of memory, for example, random access memory (RAM), dynamic RAM (DRAM), synchronous DRAM (SDRAM), and other forms of memory configured to store information. The memory 36 may be configured to store the image data and programs (e.g., algorithms) that the processor 34 utilizes to analyze the image data as described herein.

Figure 6:
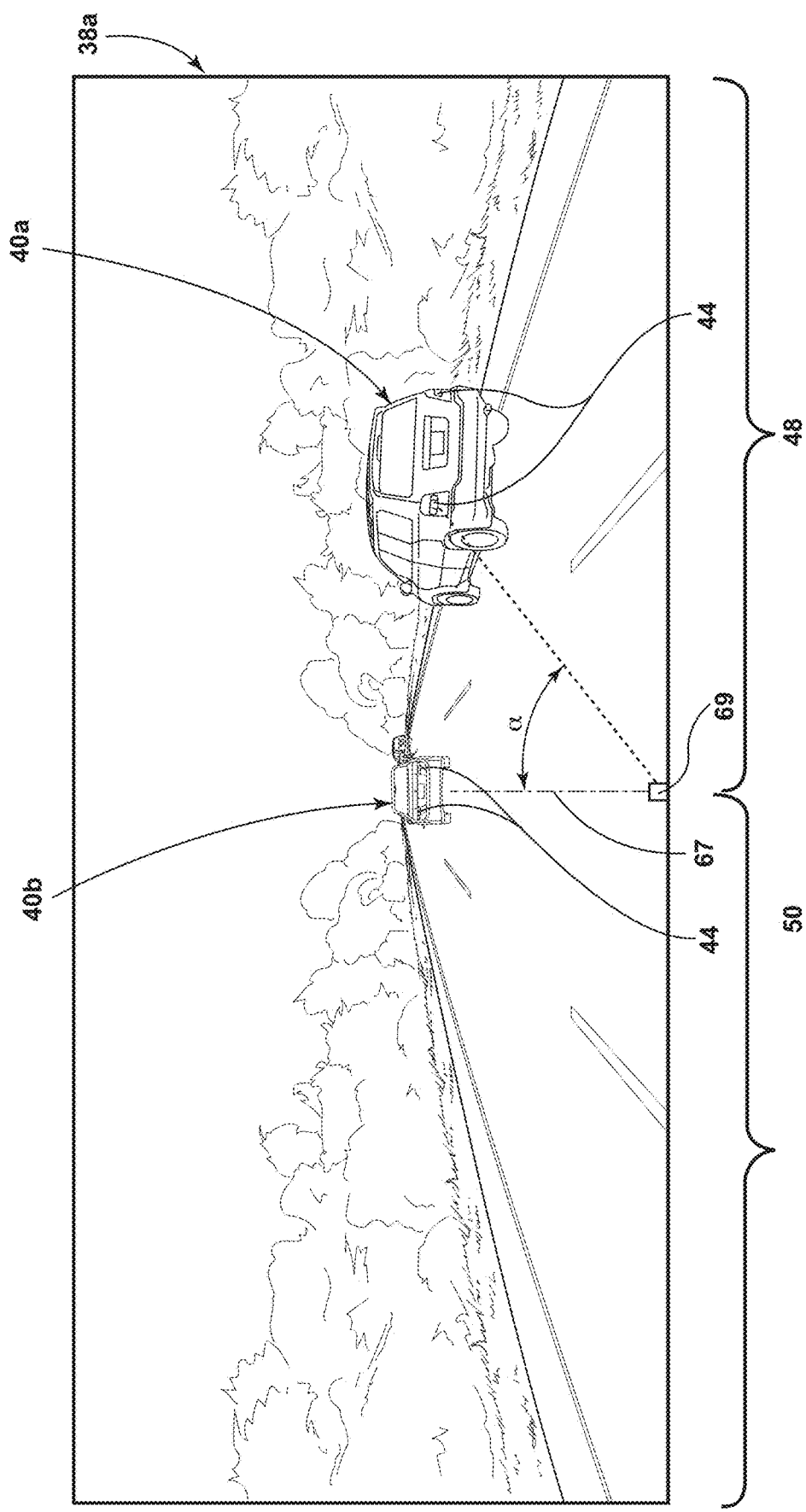
FIG. 6 is a hypothetical forward field of view and image frame of the forward imaging assembly of FIG. 1, illustrating a vehicle on a right side of the field of view having a taillight that is a particular angular deviation away from a centerline of the field of view and thus a midline of the motorcycle.
Figure 7:
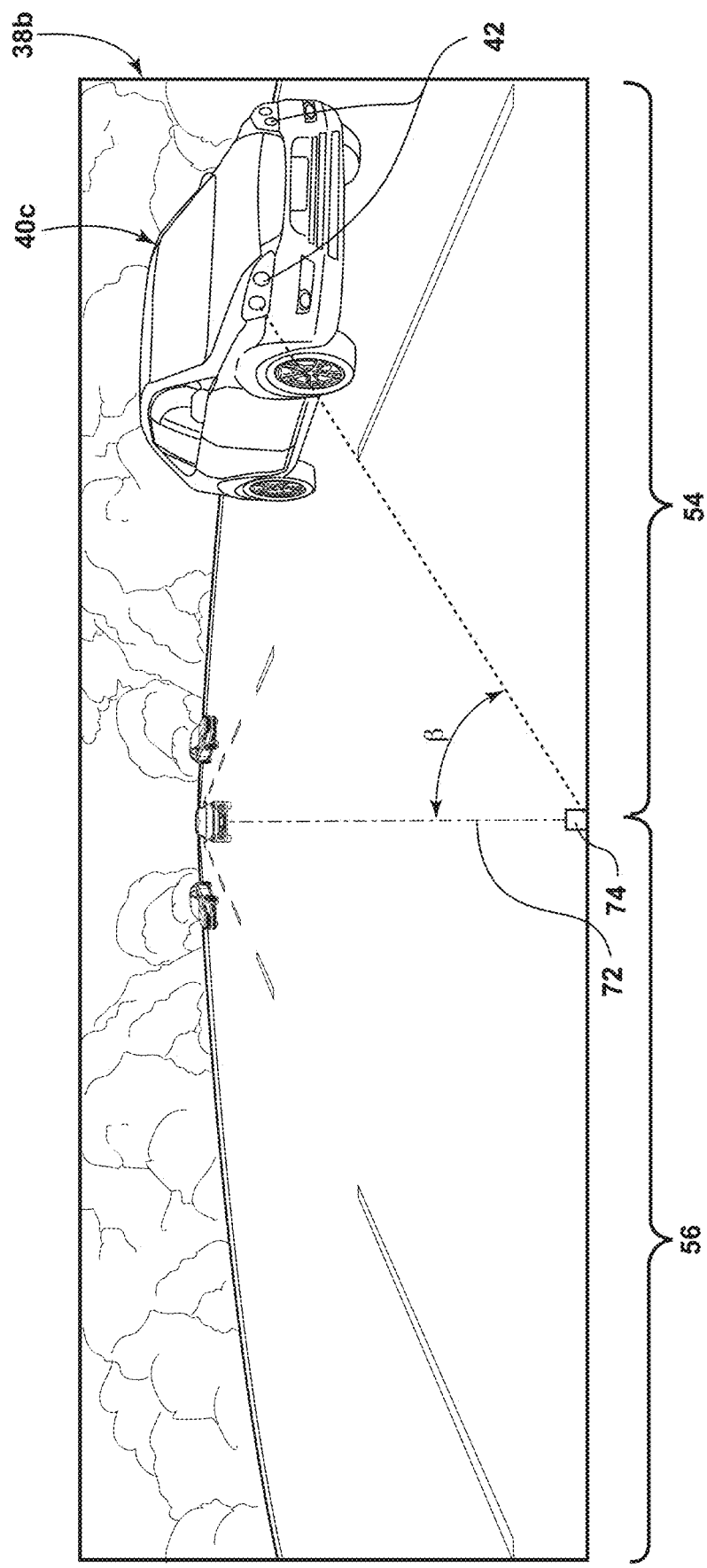
FIG. 7 is a hypothetical rearward field of view and image frame of the rearward imaging assembly of FIG. 2, illustrating a vehicle on the right side of the field of view having a headlight that is a particular angular deviation away from a centerline of the field of view and thus the midline of the motorcycle.

Referring now additionally to FIGS. 6 and 7, the controller 32 is in communication with each of the plurality of lamps 18 (such as lamps 18a-18d) and the image sensor 24 of each of the one or more imaging assemblies 22 (such as imaging assemblies 22a, 22b). The controller 32 receives as input the image data that the image sensor 24 of each of the one or more imaging assemblies 22 (such as imaging assemblies 22a, 22b) generates. The controller 32 controls activation and deactivation of each of the plurality of lamps 18 (such as lamps 18a-18d) separately, as a function of the image data, particularly the image data from the forward imaging assembly 22a of the field of view 26a demonstrating a forward scene 38a generally forward of the motorcycle 10 (FIG. 6), and the image data from the rearward imaging assembly 22b of the field of view 26b demonstrating a rearward scene 38b generally rearward of the motorcycle 10 (FIG. 7), for the purpose of warning vehicles 40 in the fields of view 26a, 26b of the motorcycle 10. Vehicles 40a-40c are illustrated as example vehicles 40. The controller 32 analyzes the image data, detects a vehicle 40 (or vehicles 40) from the image data, and then activates whichever of the plurality of lamps 18 (such as one or more of lamps 18a-18d) that illuminates the region 20a-20d (or regions 20a-20d) closest to the vehicle 40 (or vehicles 40) to provide a targeted visual warning to the vehicle 40 (or vehicles 40) of the motorcycle 10. The controller 32 can utilize one or more image processing algorithms stored in the memory 36 and processed by the processor 34 to identify the vehicle 40 (or vehicles 40) from the image data.

In embodiments, the controller 32 analyzes the image data from the image sensor 24 of the forward imaging assembly 22a, detects the vehicle 40 from the image data, and activates whichever of the forward-left lamp 18b or the forward-right lamp 18a that illuminates the region 20 of the plurality of regions 20a-20d that is closest to the vehicle 40. For example, in reference to FIG. 6, the controller 32 analyzes the image data from the image sensor 24 of the forward imaging assembly 22a, detects the vehicle 40a from the image data, and activates the forward-right lamp 18a because the forward-right lamp 18a illuminates the region 20a and the region 20a is closer to the vehicle 40a than the region 20b that the forward-left lamp 18b illuminates.

In embodiments, the controller 32 analyzes the image data from the image sensor 24 of the rearward imaging assembly 22b, detects the vehicle 40 from the image data, and activates whichever of the rearward-right lamp 18c or the rearward-left lamp 18d that illuminates the region 20 of the plurality of regions 20a-20d that is closest to the vehicle 40. For example, in reference to FIG. 7, the controller 32 analyzes the image data from the image sensor 24 of the rearward imaging assembly 22b, detects the vehicle 40c from the image data, and activates the rearward-left lamp 18d because the rearward-left lamp 18d illuminates the region 20d and the region 20d is closer to the vehicle 40c than the region 20c that the rearward-right lamp 18c illuminates.

In embodiments, such as during nighttime and other low ambient lighting conditions, the controller 32 analyzes the image data and detects the vehicle 40 using an image processing algorithm that identifies a signature of a light emission from a headlight 42 or a taillight 44 of the vehicle 40. Detection of such a signature allows for the assumption that the vehicle 40 is near the motorcycle 10. An ambient light sensor 46 (FIGS. 1, 5) can provide input concerning the ambient light level to the controller 32, for the controller 32 to determine whether it is nighttime or a low ambient lighting condition (such as below threshold lux values, e.g., 20 lux).

In embodiments, the controller 32 analyzes image data from the image sensor 24 of the forward imaging assembly 22a and detects the vehicle 40 from the image data using the image processing algorithm that identifies the signature of the light emission from the taillight 44 of the vehicle 40, and activates whichever of the forward-left lamp 18b or the forward-right lamp 18a that illuminates the region 20 of the plurality of regions 20a-20d that is closest to the vehicle 40. In other words, the controller 32 using the image processing algorithm analyzes the image data of the forward scene 38a forward of the motorcycle 10 from the image sensor 24 of the forward imaging assembly 22a for the signature of the light emission from the taillight 44 of the vehicle 40. For example, in reference to FIG. 6, the controller 32 analyzes image data from the image sensor 24 of the forward imaging assembly 22a of forward scene 38a forward of the motorcycle 10 and detects the vehicle 40a from the image data using the image processing algorithm the signature of the light emission from the taillight 44 of the vehicle 40, and activates the forward-right lamp 18a that illuminates the region 20a because region 20a is closest to the vehicle 40.

In embodiments, the controller 32 analyzes image data from the image sensor 24 of the rearward imaging assembly 22b and detects the vehicle 40 from the image data using the image processing algorithm that identifies the signature of the light emission from the headlight 42 of the vehicle 40, and activates whichever of the rearward-left lamp 18d or the rearward-right lamp 18c that illuminates the region 20 of the plurality of regions 20a-20d that is closest to the vehicle 40. In other words, the controller 32 using the image processing algorithm analyzes the image data of the rearward scene 38b rearward of the motorcycle 10 from the image sensor 24 of the rearward imaging assembly 22b for the signature of the light emission from the headlight 42 of the vehicle 40. For example, in reference to FIG. 7, the controller 32 analyzes image data from the image sensor 24 of the rearward imaging assembly 22b of rearward scene 38b rearward of the motorcycle 10 and detects the vehicle 40c from the image data using the image processing algorithm that identifies the signature of the light emission from the headlight 42 of the vehicle 40, and activates the rearward-left lamp 18d that illuminates the region 20d because region 20d is closest to the vehicle 40.

In embodiments, for vehicles 40 forward of the motorcycle 10 (FIG. 5) (e.g., vehicles 40a, 40b), the image processing algorithm searches for the presence of light emissions from the taillights 44 of the vehicle(s) 40 forward of the motorcycle 10 representative of the vehicle(s) 40 and traveling in the same general direction as the motorcycle 10, to the exclusion of oncoming vehicles 40 with headlights 42. In embodiments, for vehicles 40 rearward of the motorcycle 10 (FIG. 6) (e.g., vehicle 40c), the image processing algorithms search for the presence of light emissions from the headlights 42 of the vehicle(s) 40 rearward of the motorcycle 10 representative of the vehicle(s) 40 and traveling in the same general direction as the motorcycle 10, to the exclusion of passed vehicles 40 with taillights 44. The forward directed imaging assembly 22*a* and the rearward imaging assembly 22*b* can include a color filter to assist in properly discriminating headlamps from tail lamps using their respective image sensor 24.

The forward scene 38*a* of the field of view 26*a* is exposed onto the pixel array 28 of the image sensor 24 of the imaging assembly 22*a*, and the rearward scene 38*b* of the field of view 26*b* is exposed onto the pixel array 28 of the image sensor 24 of the imaging assembly 22*b*. Each pixel of the pixel array 28 produces an output signal that is representative of the illumination sensed by each pixel. This output signal may be in analog, which can be converted to a digital gray scale value (such as 8 bit, with a value between 0 and 255). The image sensor 24 associated with the forward imaging assembly 22*a* should be just sensitive enough to image the taillight 44 emissions of the vehicle 40 (e.g., vehicles 40*a*, 40*b*) at the maximum distance for which a light emission warning from the motorcycle 10 to the vehicle 40 would be relevant (such as 15 feet). The image sensor 24 associated with the rearward imaging assembly 22*b* should be just sensitive enough to image the headlight 42 emissions of the vehicle 40 (e.g., vehicle 40*c*) at the maximum distance for which a light emission warning from the motorcycle 10 to the vehicle 40 would be relevant (such as 15 feet). Such a low sensitivity reduces the likelihood of the controller 32 interpreting images of light reflecting off signs and reflectors as headlights 42 or taillights 44 as the case may be.

In embodiments, an individual pixel or group of pixels of the pixel array 28 has a location on the pixel array 28 that is identified by X and Y coordinates, with the 0,0 pixel location corresponding to a top left pixel, which can correspond to the top left of the forward scene 38*a* or rearward scene 38*b* as the case may be. Beginning with the 0,0 pixel and raster scanning through the pixel array 28, each pixel is compared to a minimum threshold, which dictates the faintest light that is of interest. If the current pixel is below the minimum threshold and it is not the last pixel of the pixel array 28, then the analysis proceeds to the next pixel. The raster scanning can be pixel-by-pixel to the right in the X-direction, and then dropping down one row in the Y-direction and beginning again with the left most pixel in the X-direction.

If the current pixel value is greater than the minimum threshold, then a seed fill analysis algorithm is entered in which the size, brightness, and other parameters of the identified light source are determined. The seed fill algorithm is used to identify the pixels of the image sensor 24 associated with a common light source, and thus identify associated pixels meeting a pixel criteria. This can be accomplished by identifying contiguous pixels exceeding their respective threshold levels. If no light source is detected, the analysis of the image data terminates. The analysis is continuous during operation of the motorcycle 10 and is repeated with the generation of new image data.

The controller 32 can determine the average X-Y coordinates of the pixels imaging a light source (representing the center of the light source and therefore representing the vehicle 40), the sum of the gray scale values of all the pixels representing the light source, the number of pixels representing the light source, among other variables. The sum of the gray scale values of all the pixels representing the light source is an indication of the "brightness" of the light source, from which the relative color of the light source can be determined.

This is relevant to the forward scene 38*a*, because the controller 32 is analyzing the image data to find red taillights 44 of the vehicles 40 rather than the whiter and "brighter" headlights 42 of oncoming vehicles 40. Thus, if the sum of the gray scale values of all the pixels representing the light source is above a predetermined threshold, then the light source is disregarded as not possibly representing a red colored taillight 44.

It is also relevant to the rearward scene 38*b*, because the controller 32 is analyzing the image data to find the whiter and "brighter" headlights of trailing vehicles 40 rather than the red and less "bright" taillights 44 of vehicles 40 having passed the motorcycle 10 and traveling in the opposite direction. Thus, if the sum of the gray scale values of all the pixels representing the light source is below a predetermined threshold, then the light source is disregarded as not possibly representing a bright, not-red, headlight 42.

If the controller 32 determines from the image data that the forward scene 38*a* has illuminated taillight(s) 44 from one or more vehicles 40, the controller 32 determines a general location of the taillight(s) 44. As mentioned, the controller 32 determines the X-Y coordinate for the light source on the pixel array 28. The pixel array 28 from the forward imaging assembly 22*a* represents the forward scene 38*a*. Thus, the determined X-Y coordinate for the light source on the pixel array 28 is the position of the light source of the forward scene 38*a*. Likewise, the determined X-Y coordinate of the light source is an approximation of the location of the light source relative to the motorcycle 10, and thus an approximation of the location of the vehicle 40 relative to the motorcycle 10.

The controller 32 then determines which of the plurality of lamps 18*a*-18*d* (the headlight 14 is assumed to already be activated during low ambient light) illuminates most toward the position of the taillight 44. As an example, in the forward scene 38*a* illustrated at FIG. 6, the taillights 44 of the vehicle 40*a* are generally to the right side 48 of the forward scene 38*a*, and because the forward-right lamp 18*a* is positioned to illuminate the region 20*a*, which is forward and to the right of the motorcycle 10, the controller 32 activates the forward-right lamp 18*a* to provide a warning to the vehicle 40*a* that the motorcycle 10 is nearby. If the forward scene 38*a* were flipped, and the taillights 44 of the vehicle 40*a* were generally to the left side 50 of the forward scene 38*a*, then the controller 32 would activate the forward-left lamp 18*b* (as positioned to illuminate the region 20*b*, which is forward and to the left of the motorcycle 10), to provide a warning to the vehicle 40*a* that the motorcycle 10 is nearby. Providing a visual warning to the vehicle 40*a* may lessen the likelihood that the operator of the vehicle 40*a* does not recognize the motorcycle 10 and veer 52 (FIG. 8) toward the motorcycle 10.

If the controller 32 determines from the image data that the rearward scene 38*b* has illuminated headlight(s) 42 from one or more vehicles 40 (e.g., vehicle 40*c*), the controller 32 determines a general location of the headlight(s) 42. As mentioned, the controller 32 determines the X-Y coordinate for the light source on the pixel array 28 of the image sensor 24 of the rearward imaging assembly 22*b*. The pixel array 28 represents the rearward scene 38*b*. Thus, the determined X-Y coordinate for the light source on the pixel array 28 is the position of the light source of the rearward scene 38*b*. In other words, the controller 32 determines the position of the vehicle 40 relative to the motorcycle 10 by determining the X-Y coordinates of the vehicle 40 on the pixel array 28, such as the headlight 42 or taillight 44 of the vehicle 40. More details concerning identifying light sources from image data is detailed at U.S. Pat. No. 6,611,610 (Aug. 26, 2003), the entirety of which is disclosed herein by reference.

The controller 32 then determines which of the lamps 18 illuminates most toward the position of the headlight 42. As an example, in the rearward scene 38b illustrated at FIG. 7, the headlights 42 of the vehicle 40c are generally to the right side 54 of the rearward scene 38b, and because the rearward-left lamp 18d is positioned to illuminate the region 20d toward the vehicle 40c, the controller 32 activates the rearward-left lamp 18d to provide a warning to the vehicle 40c that the motorcycle 10 is nearby. If the rearward scene 38b were flipped, and the headlight(s) 42 of the vehicle 40c were generally to the left side 56 of the rearward scene 38b, then the controller 32 would activate the rearward-right lamp 18c (as positioned to illuminate the region 20c toward the vehicle 40c), to provide a warning to the vehicle 40c that the motorcycle 10 is nearby. Providing a visual warning to the vehicle 40c may lessen the likelihood that the operator of the vehicle 40c does not recognize the motorcycle 10 and veer 58 (FIG. 8) toward the motorcycle 10.

Referring back to FIGS. 1, 2, and 6, in embodiments, the lighting system 12 of the motorcycle 10 includes a positionable forward lamp 60 that is positionable to emit light forward of the motorcycle 10 from an angular position within a range of angular positions 62, and a positionable rearward lamp 64 that is positionable to emit light rearward of the motorcycle from an angular position within a range of angular positions 66, relative to a midline 68 of the motorcycle 10. In embodiments, the positionable forward lamp 60 and the positionable rearward lamp 64 can each rotate about an axis to emit light from an angular position within the ranges of angular positions 62, 66, respectively relative to the midline 68 of the motorcycle 10. The controller 32 controls the angular position of the lamps 60, 64, such as through control of a direct current (DC) motor coupled to each of the lamps 60, 64, as well as activation and deactivation of the lamps 60, 64. In embodiments, the forward imaging assembly 22a has the field of view 26a that encompasses the angular range of positions 62 from which the positionable forward lamp 60 can be positioned to emit light. In an embodiment, the rearward imaging assembly 22b has the field of view 26b that encompasses the angular range of positions 66 from which the positionable rearward lamp 64 can be positioned to emit light.

Figure 8:
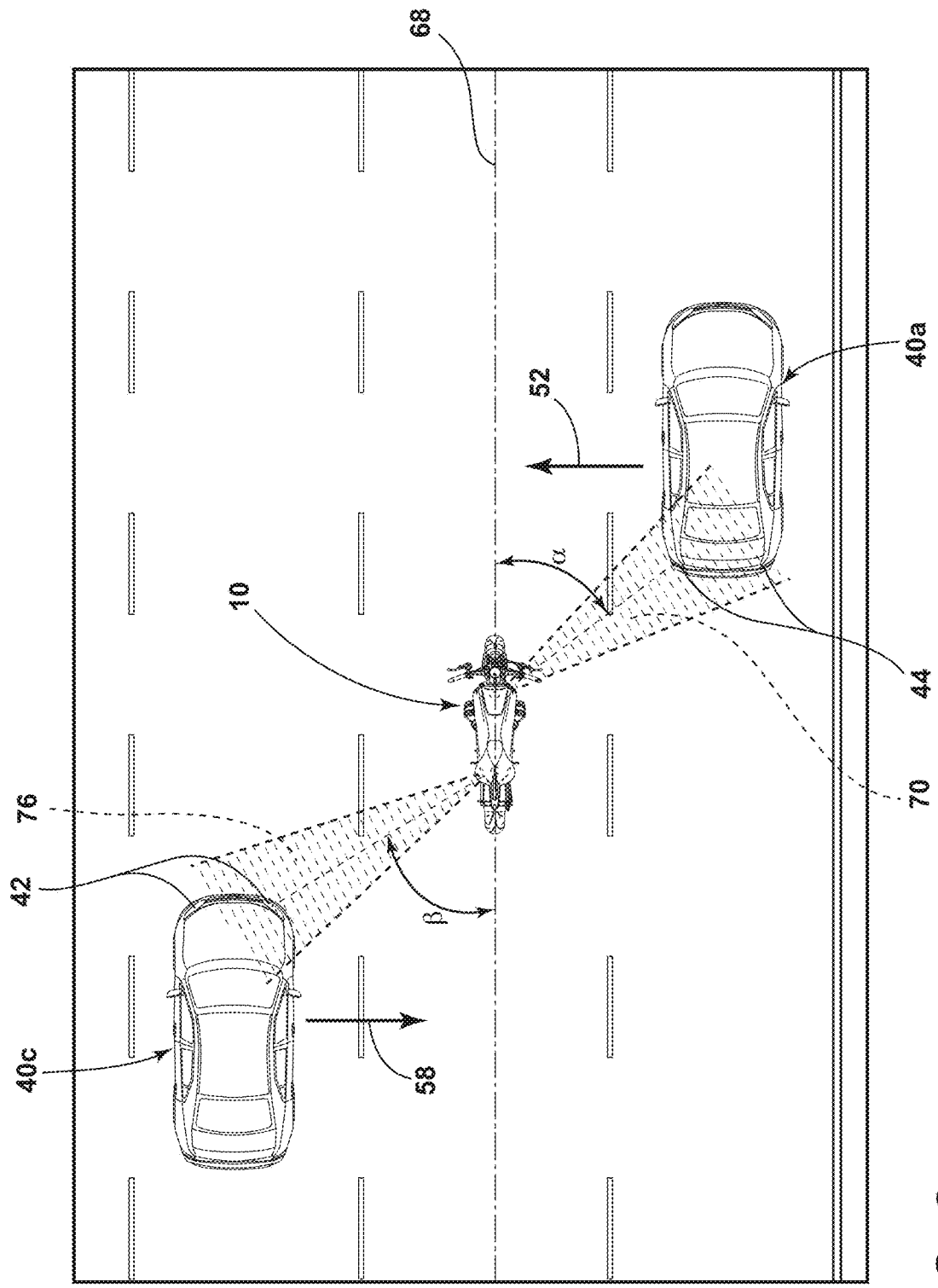
FIG. 8 is an overhead view of the motorcycle of FIG. 1 melding conceptually the fields of view of FIGS. 6 and 7, illustrating the controller causing the forward-right lamp and/or the forward positionable lamp to illuminate in the direction of the angular deviation α toward the vehicle forward of the vehicle, and causing the rearward-left lamp and/or the rearward positionable lamp to illuminate in the direction of angular deviation β toward the vehicle rearward of the vehicle, in order to provide a visual warning to the vehicles of the motorcycle to reduce the likelihood of the vehicles veering toward the motorcycle.

Referring now additionally to FIG. 8, the controller 32, after detecting the vehicle 40 from the image data from the forward imaging assembly 22a, as described above, activates the positionable forward lamp 60 and adjusts the angular position of the positionable forward lamp 60 to emit the light toward the vehicle 40 to provide a visual warning to the vehicle 40 of the motorcycle 10. Alternatively or additionally, the controller 32, after detecting the vehicle 40 from the image data from the rearward imaging assembly 22b, as described above, activates the positionable rearward lamp 64 and adjusts the angular position of the positionable rearward lamp 64 to emit the light toward the vehicle 40 to provide a visual warning to the vehicle 40 of the motorcycle 10.

In embodiments, when the controller 32 detects a vehicle 40 from the image data, the controller 32 further (i) determines the X-Y coordinates of the vehicle 40 on the pixel array 28, (ii) determines the angular deviation $\alpha$, $\beta$ of the vehicle 40 from a centerline 67 of the pixel array 28, and (iii) adjusts the angular position of the positionable forward lamp 60 or positionable rearward lamp 64 relative to the midline 68 of the motorcycle 10 to match the angular deviation $\alpha$, $\beta$ of the vehicle 40 from a centerline 67 of the pixel array 28. For example, when the controller 32 identifies a signature of a light emission of a taillight 44 forward of the motorcycle 10 from the image data from the forward imaging assembly 22a, the controller 32, as mentioned, can determine the center point of the signature on the X-Y coordinates of the pixel array 28, which corresponds to the forward scene 38a. The X-Y coordinates of the center point of the signature can be assumed to be the X-Y coordinates of the vehicle 40, of which the taillight 44 is a part. The controller 32 then determines the angular deviation $\alpha$ of the center point of the signature. The angular deviation $\alpha$ is a deviation from a centerline 67 of the pixel array 28 (and thus of the forward scene 38a, and thus of the midline 68 of the motorcycle 10) that extends from a base pixel 69 representing the center of the pixel array 28 closest to the motorcycle 10. The controller 32 then rotates the positionable forward lamp 60 to the angular position of the range of angular positions 62 that matches the angular deviation $\alpha$ and causes the positionable forward lamp 60 to emit light 70, which warns the operator of the vehicle 40a that the motorcycle 10 exists. The warning reduces the likelihood that the vehicle 40a will veer 52 into the motorcycle 10, or toward the motorcycle 10, or in the direction of travel of the motorcycle 10.

As another example, when the controller 32 identifies a signature of a light emission of a headlight 42 rearward of the motorcycle 10 from the image data from the rearward imaging assembly 22b, the controller 32, as mentioned, can determine the center point of the light source on the X-Y coordinates of the pixel array 28, which corresponds to the forward scene 38a. The X-Y coordinates of the center point of the signature can be assumed to be the X-Y coordinates of the vehicle 40, of which the headlight 42 is a part. The controller 32 then determines the angular deviation $\beta$ of the center point of the signature. The angular deviation $\beta$ is a deviation from a centerline 72 of the pixel array 28 (and thus of the rearward scene 38b, and thus of the midline 68 of the motorcycle 10) that extends from a base pixel 74 representing the center of the pixel array 28 closest to the motorcycle 10. The controller 32 then rotates the positionable rearward lamp 64 to the same angular deviation $\beta$ from the midline 68 of the motorcycle 10 and causes the positionable rearward lamp 64 to emit light 76, which warns the operator of the vehicle 40c that the motorcycle 10 exists. The warning reduces the likelihood that the vehicle 40c will veer 58 into the motorcycle 10, or toward the motorcycle 10, or in the direction of travel of the motorcycle 10.

In embodiments, the controller 32 causes one or more of the plurality of lamps 18a-18d to emit light toward the vehicle 40, as the case may be, continuously or in a blinking manner, during the period of time while the controller 32 detects the vehicle 40 from the image data. Because the position of the vehicle 40 moves relative to the motorcycle 10 as a function of time, the controller 32 continuously reevaluates the image data to determine the location of the vehicle 40 relative to the motorcycle 10. As the controller 32 continuously reevaluates the image data, the controller 32 activates the lamp 18 of the plurality of lamps 18a-18d that illuminates the region 20 of the plurality of regions 20a-20d that is closest to the vehicle 40. In embodiments where the motorcycle 10 includes the positionable lamps 60, 64, the controller 32 further continuously adjusts the angular position of the positionable lamps 60, 64 based on the continuously determined location of the vehicle 40. Thus, the light emitted from the positionable forward lamp 60 or the positionable rearward lamp 64 follows the vehicle 40 until the controller 32 no longer detects the vehicle 40 as relevant.

In some embodiments, the controller 32 changes how the lamp(s) 18a-18d, 60, 64 emit light if the controller 32 determines that vehicle 40 (such as the detected light source assumed to be the vehicle 40) is moving closer to the motorcycle 10 (such as veering 52, 58 toward the motorcycle 10 or into the direction of travel of the motorcycle 10). For example, the controller 32 can cause the lamp(s) 18a-18d, 60, 64 to emit light in a blinking manner (like a strobe-light) in an attempt to more urgently warn the vehicle 40 of the presence of the motorcycle 10. In embodiments, the controller 32 determines that the vehicle 40 is veering 52,58 toward the motorcycle 10 by identifying a pixel shift in the X-Y coordinates of the vehicle 40 (such as the light source from the vehicle 40) over a plurality of image frames. A pixel shift is a change in the X-Y coordinates of the determined center of the vehicle 40 (such as the light source). For the forward scene 38a, if the pixel shift is toward the centerline 67 of the pixel array 28 (representative of the forward scene 38a and thus the midline 68 of the motorcycle 10), then the controller 32 can assume that the vehicle 40 is entering the path of travel of the motorcycle 10 and change the illumination pattern of the lamps 18a, 18b, 60 accordingly. For the rearward scene 38b, if the pixel shift is toward the centerline 72 of the pixel array 28 and along the same pixel row or closer to the pixel representative of the rearward scene 38b closest to the motorcycle 10, then the controller 32 can assume that the vehicle 40 is progressing closer to the motorcycle 10 and change the illumination pattern of the lamps 18c, 18d, 64 accordingly.

During daytime and other sufficient ambient lighting conditions where it is more difficult to identify light sources as a proxy for the vehicle 40, the controller 32 can utilize machine-learned image recognition algorithms, such as convolutional neural networks generated using training data. The training data include training image frames, which depict real-world road conditions and can be images captured by imaging assemblies. For example, imaging assemblies on other motorcycles can capture the training image frames as the vehicles operate under real-world conditions. The training image frames can be analyzed and vehicles nearby the other motorcycles in positions relative to the motorcycles similar to the positions of vehicles 40 can be identified. The pixels of the vehicles in the image frames can be labeled as representing vehicles.

The convolutional neural networks can comprise a plurality of layers, each of which can comprise a plurality of artificial neurons. Using the convolutional neural networks, the controller 32 analyzes the image data to determine whether regions of the frame of image data depict a vehicle 40 near the motorcycle 10. More on convolutional neural networks is set forth in U.S. Pat. No. 10,007,269 B1 (Jun. 26, 2018), the entirety of which is incorporated herein by reference.

As described above, once the controller 32 identifies one or more relevant vehicles 40, such as vehicles 40a-40c, the controller 32 then determines which of the lamps 18-18d, 60, 64 illuminates the region 20 of the plurality of regions 20a-20d closest to the identified vehicle(s) 40. The controller 32 then activates those lamp(s) 18a-18d, as the case may be. In the event that the motorcycle 10 includes the positionable forward lamp 60 and positionable rearward lamp 64, the controller 32 can determine the center point (or some other reference point) on the X-Y coordinates of the pixel array 28 for the identified vehicle(s) 40. The controller 32 then determines the angular deviation α, β and positions the lamp(s) 60, 64 accordingly, in the manner described above. In addition, as described above, the controller 32 changes how the lamp(s) 18a-18d, 60, 64 emit light if the controller 32 determines that the identified vehicle 40 is moving closer to the motorcycle 10.

Figure 9:
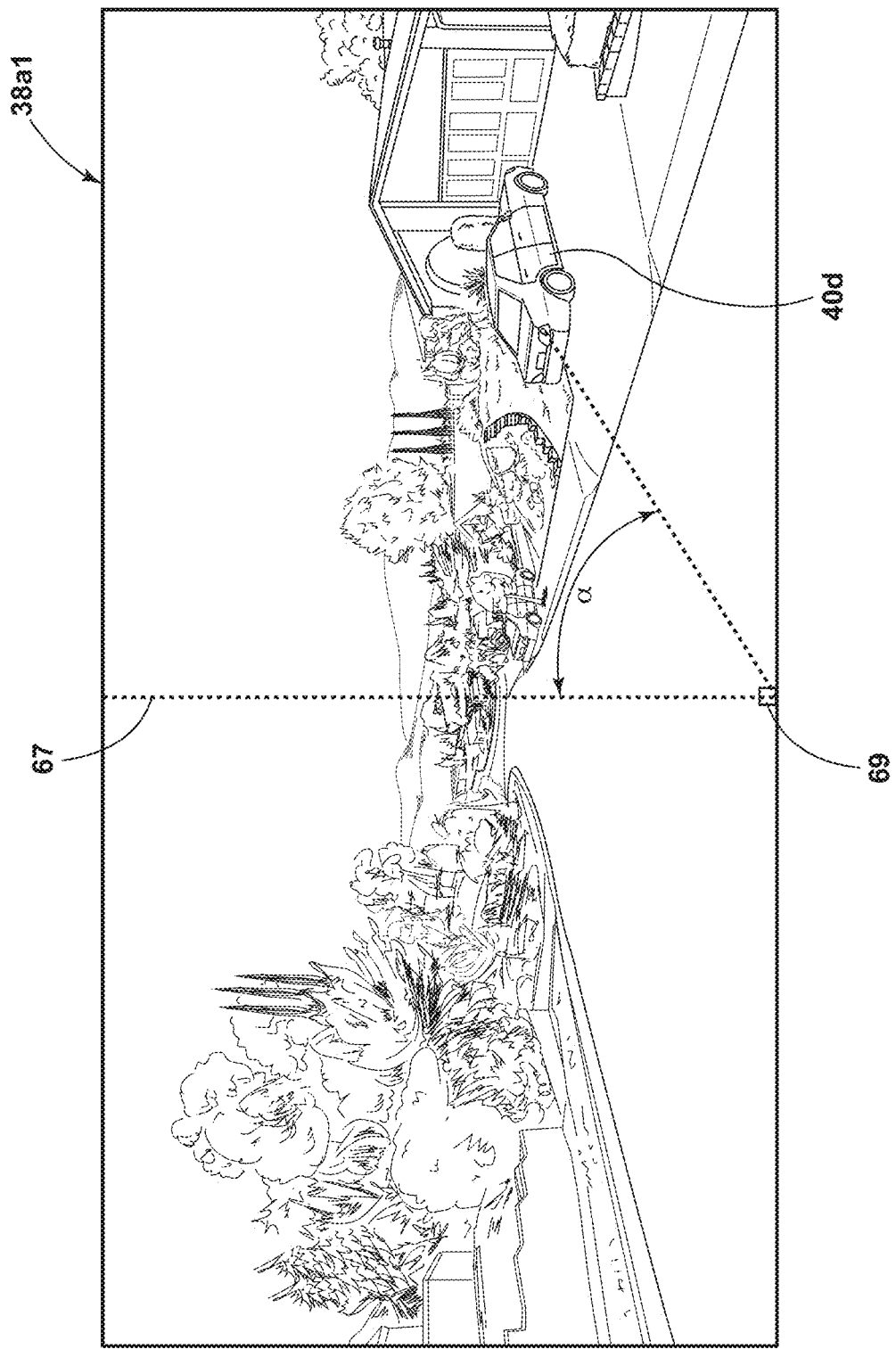
Figure 10:
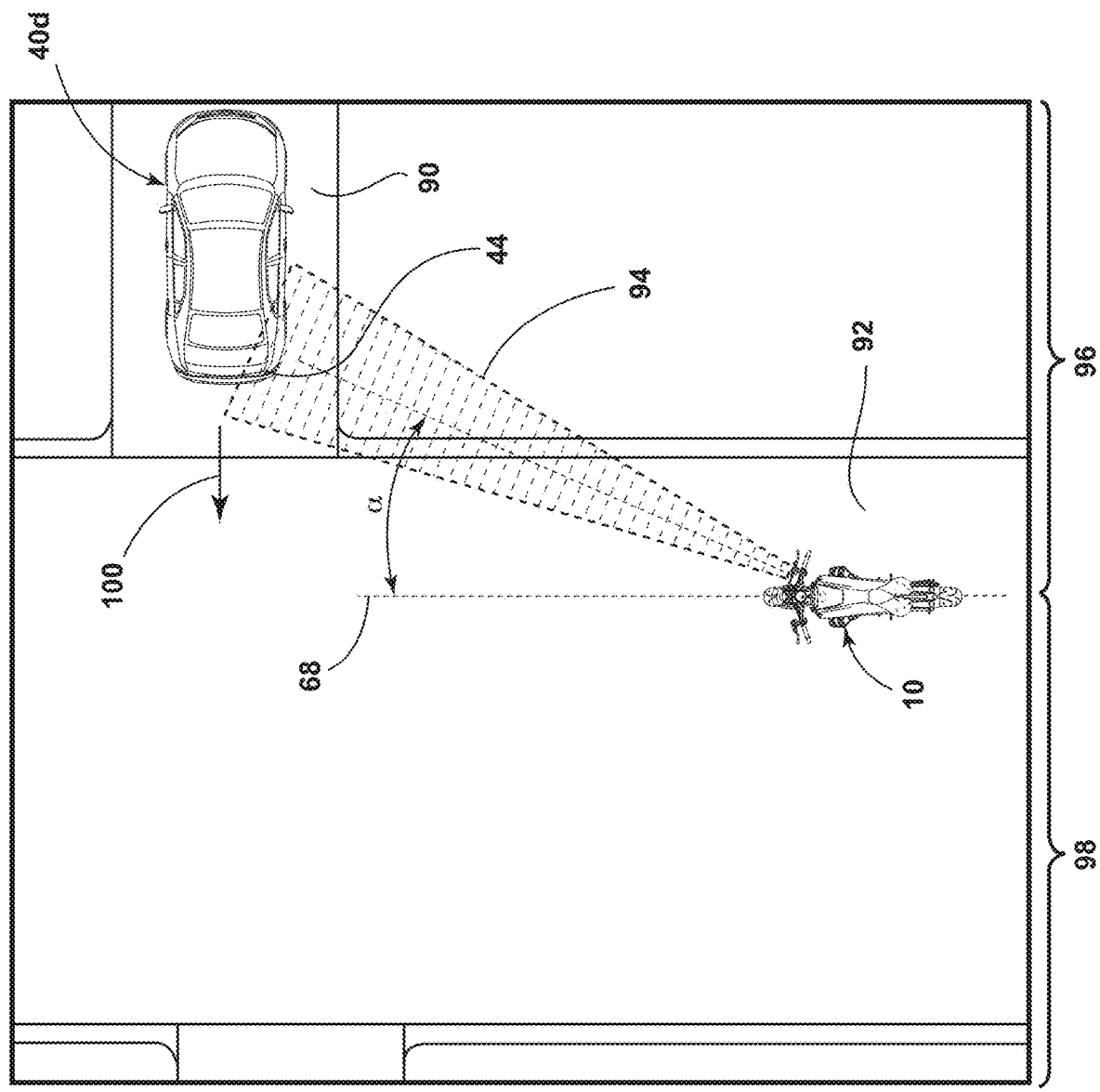
FIG. 10 is an overhead view of the motorcycle of FIG. 1 showing the scenario of the field of view of FIG. 9, illustrating the controller causing the forward-right lamp and/or the forward positionable lamp to illuminate in the direction toward the vehicle in the driveway, in order to provide a visual warning to the vehicle to reduce the likelihood of the vehicle backing out into the road before the motorcycle passes the vehicle.

As the Background above alludes, the motorcycle 10 described herein provides a visual warning not just to the operator of the vehicle 40 nearby the motorcycle 10 in the context of highway driving, but also to the operators of vehicle 40 in a driveway adjacent to a road 92 on which the motorcycle 10 is travelling. Referring now to FIGS. 9 and 10, the imaging assembly 22a of the motorcycle 10, with the field of view 26a captured by the image sensor 24 of the imaging assembly 22a, captures a forward scene 38a1 generally forward of the motorcycle 10. The forward scene 38a1 includes another example vehicle 40d. The vehicle 40d is in a driveway 90, which is adjacent to the road 92 on which the motorcycle 10 is traveling. The controller 32 analyzes the image data and detects the presence of the vehicle 40d from the image data that the image sensor 24 sends to the controller 32. The controller 32 then activates the lamp 18a-18d that illuminates the region 20 closest to the vehicle 40d (such as the lamp 18a, as illustrated in FIG. 10 emitting the light 94) to provide a targeted visual warning to the vehicle 40d.

The controller 32 can utilize one or more image processing algorithms stored in the memory 36 and processed by the processor 34 to identify the vehicle 40d from the image data, as described above. In an embodiment, as discussed above, during nighttime and other low ambient lighting conditions, the one or more image processing algorithms analyze the image data from the forward scene 38a1 for a signature of a light emission from a taillight 44 (such as the taillight 44 of the vehicle 40d in the driveway 90). The controller 32 can determine the general location of the taillight 44 by determining the X-Y coordinate of the light source on the pixel array 28 from the forward imaging assembly 22a representing the forward scene 38a1, in the manner explained above. The controller 32 then determines which of the plurality of lamps 18a-18d illuminates most toward the position of the taillight 44. In the forward scene 38a1, the taillight 44 of the vehicle 40d is generally to the right side 96 of the forward scene 38a1, as opposed to the left side 98 of the forward scene 38a1. Because the forward-right lamp 18a is positioned to illuminate the region 20a, which is forward and to the right of the motorcycle 10, the controller 32 activates the lamp 18a to provide a warning to the vehicle 40d that the motorcycle 10 is nearby.

If the motorcycle 10 includes the positionable forward lamp 60, described above, that is configured to emit light from the range of angular positions 62, then the controller 32 can determine the angular deviation α of the center point of the light source from the centerline 67 of the pixel array 28 (and thus of the forward scene 38a1 and thus of the midline 68 of the motorcycle 10) that extends from the base pixel 69 representing the center of the pixel array 28 closest to the motorcycle 10. The controller 32 then rotates the positionable forward lamp 60 to the angular position of the range of angular positions 62 that matches the angular deviation α and causes the positionable forward lamp 60 to emit the light 94.

The operator of the vehicle 40d, seeing the light 94 from the lamp 18a or the positionable forward lamp 60, may then not backup 100 into the road 92 in the way of or into the motorcycle 10. As explained above, the controller 32 can cause the chosen lamp 18a-18d or the positionable forward lamp 60 to emit the light 94 in a different manner if the controller 32 determines that the signature of the light source from the vehicle 40 (such as from the taillight 44 of the vehicle 40d) is moving closer to the motorcycle 10. For example, the controller 32 can monitor the image data over a plurality of image frames for a pixel shift in the signature toward the centerline 67 of the pixel array 28, representing the vehicle 40d backing out of the driveway 90 toward (and perhaps into) the road 92.

During daytime and other sufficient ambient lighting conditions, the controller 32 can utilize machine-learned image recognition algorithms, such as convolutional neural networks generated using training data, as explained above, to determine the presence of a vehicle 40 in a driveway 90 and cause the relevant lamp(s) 18a-18d, 60 to emit the light 94.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A motorcycle comprising:
a lighting system including a plurality of lamps, each of which is configured to be activated and deactivated to selectively illuminate a different region of a plurality of regions relative to the motorcycle, the plurality of lamps comprising forward lamps and rearward lamps;
one or more imaging assemblies, each of which includes an image sensor configured to generate image data during operation of the motorcycle; and
a controller in communication with each of the plurality of lamps that receives as input the image data that the image sensor of each of the one or more imaging assemblies generates, analyzes the image data, detects a vehicle from the image data, and activates whichever lamp of the plurality of lamps that illuminates the region of the plurality of regions that is closest to the vehicle to provide a visual warning to the vehicle.

2. The motorcycle of claim 1,
the controller analyzes the image data and detects the vehicle from the image data using an image processing algorithm that identifies a signature of a light emission from a headlight or a taillight of the vehicle.

3. The motorcycle of claim 2,
the one or more imaging assemblies includes a forward imaging assembly with a field of view that is generally forward of the motorcycle;
the forward lamps include a forward-right lamp configured to illuminate a forward-right region that is forward and to the right of the motorcycle, and a forward-left lamp configured to illuminate a forward-left region that is forward and to the left of the motorcycle; and
the controller analyzes the image data from the forward imaging assembly and detects the vehicle from the image data using the image processing algorithm that identifies the signature of the light emission from the taillight of the vehicle, and activates whichever of the forward-left lamp or the forward-right lamp that illuminates whichever of the forward-right region or the forward-left region that is closest to the vehicle.

4. The motorcycle of claim 2,
the one or more imaging assemblies further includes a rearward imaging assembly with a field of view that is generally rearward of the motorcycle;
the rearward lamps include a rearward-right lamp configured to illuminate a rearward-right region that is rearward and to the right of the motorcycle, and a rearward-left lamp configured to illuminate a rearward-left region that is rearward and to the left of the motorcycle; and
the controller analyzes the image data from the rearward imaging assembly and detects the vehicle from the image data using the image processing algorithm that identifies the signature of the light emission from the headlight of the vehicle, and activates whichever of the rearward-right lamp or the rearward-left lamp that illuminates whichever of the rearward-right region or the rearward-left region that is closest to the vehicle.

5. The motorcycle of claim 1,
the image sensor includes a pixel array with X-Y coordinates; and
the controller further determines a position of the vehicle relative to the motorcycle by determining the X-Y coordinates of the vehicle on the pixel array.

6. The motorcycle of claim 5,
the controller determines that the vehicle is veering toward the motorcycle by identifying a pixel shift in the X-Y coordinates of the vehicle on the pixel array over a plurality of image frames, and causes the lamp to illuminate the region in a blinking manner.

7. The motorcycle of claim 1,
the forward lamps comprising a forward-right lamp configured to illuminate a forward-right region that is forward and to the right of the motorcycle;
the forward lamps comprising a forward-left lamp configured to illuminate a forward-left region that is forward and to the left of the motorcycle;
the rearward lamps comprising a rearward-right lamp configured to illuminate a rearward-right region that is rearward and to the right of the motorcycle; and
the rearward lamps comprising a rearward-left lamp configured to illuminate a rearward-left region that is rearward and to the left of the motorcycle.

8. The motorcycle of claim 1, the one or more imaging assemblies including:
a forward imaging assembly with a field of view that is generally forward of the motorcycle; and
a rearward imaging assembly with a field of view that is generally rearward of the motorcycle.

9. The motorcycle of claim 1,
the one or more imaging assemblies includes a forward imaging assembly with a field of view that is generally forward of the motorcycle;
the forward lamps include a forward-right lamp configured to illuminate a forward-right region that is forward and to the right of the motorcycle, and a forward-left lamp configured to illuminate a forward-left region that is forward and to the left of the motorcycle; and
the controller analyzes the image data from the image sensor of the forward imaging assembly, detects the vehicle from the image data, and activates whichever of the forward-left lamp or the forward-right lamp that illuminates the region of the plurality of regions that is closest to the vehicle.

10. The motorcycle of claim 1,
the controller causes the lamp of the plurality of lamps to emit light continuously or in a blinking manner during a period of time while the controller detects the vehicle and the region of the plurality of regions that the lamp illuminates is the region of the plurality of regions that is closest to the vehicle.

11. The motorcycle of claim 1,
the controller determines that the vehicle is veering toward the motorcycle and causes the lamp to illuminate the region in a blinking manner.

12. A motorcycle comprising:
a midline;
a lighting system including a lamp that is positionable to emit light from an angular position within a range of angular positions relative to the midline of the motorcycle;
an imaging assembly including an image sensor configured to generate image data, and having a field of view that encompasses the range of angular positions from which the lamp can be positioned to emit light; and
a controller in communication with the lamp that receives as input the image data that the image sensor of the imaging assembly generates, analyzes the image data, detects a vehicle from the image data, and activates the lamp and adjusts the angular position of the lamp to emit the light toward the vehicle to provide a visual warning to the vehicle of the motorcycle.

13. The motorcycle of claim 12,
the image sensor includes a pixel array with X-Y coordinates and a centerline extending from a base pixel through the pixel array; and
the controller further determines the X-Y coordinates of the vehicle on the pixel array, determines an angular deviation of the vehicle from the centerline of the pixel array, and adjusts the angular position of the lamp relative to the midline of the motorcycle to match the angular deviation of the vehicle from the centerline of the pixel array.

14. The motorcycle of claim 13,
the lamp is positionable to emit light forward of the motorcycle;
the field of view of the imaging assembly is forward of the motorcycle; and
the controller analyzes the image data and detects the vehicle with an image processing algorithm that identifies a signature of a light emission from a taillight of the vehicle that is forward of the motorcycle, with the X-Y coordinates of the light emission from the taillight being the X-Y coordinates of the vehicle.

15. The motorcycle of claim 14 further comprising:
a rearward lamp of the lighting system that is positionable to emit light rearward of the motorcycle and from an angular position within a range of angular positions relative to the midline of the motorcycle; and
a rearward imaging assembly including an image sensor configured to generate image data, and having a field of view that is rearward of the motorcycle and encompasses the range of angular positions from which the rearward lamp can be positioned to emit light, the image sensor of the rearward imaging assembly including a pixel array with X-Y coordinates and a centerline extending from a base pixel through the pixel array;
wherein, the controller
is in further communication with the rearward lamp,
receives as input the image data that the image sensor of the rearward imaging assembly generates,
analyzes the image data from the image sensor of the rearward imaging assembly,
detects a rearward vehicle from the image data with an image processing algorithm that identifies a signature of a light emission from a headlight of the rearward vehicle,
determines the X-Y coordinates of the rearward vehicle on the pixel array of the image sensor of the rearward imaging assembly, with the X-Y coordinates of the light emission of the headlight being the X-Y coordinates of the light emission from the headlight being the X-Y coordinates of the rearward vehicle,
determines an angular deviation of the rearward vehicle from the centerline of the pixel array of the image sensor of the rearward imaging assembly,
adjusts the angular position of the rearward lamp to match the angular deviation of the rearward vehicle from the centerline of the pixel array of the image sensor of the rearward imaging assembly, and activates the rearward lamp to emit the light toward the rearward vehicle to provide a visual warning to the rearward vehicle of the motorcycle.

16. The motorcycle of claim 13,
the lamp is positionable to emit the light rearward of the motorcycle;
the field of view of the imaging assembly is rearward of the motorcycle; and
the controller analyzes the image data and detects the vehicle with an image processing algorithm that identifies a signature of a light emission from a headlight of the vehicle that is rearward of the motorcycle, with the X-Y coordinates of the light emission from the headlight being the X-Y coordinates of the vehicle.

17. The motorcycle of claim 13,
the controller causes the lamp to emit light in a blinking manner if the controller determines that the vehicle is moving closer to the motorcycle by identifying a pixel shift in the X-Y coordinates of the vehicle over a plurality of image frames.

18. The motorcycle of claim 12,
the controller continuously analyzes the image data, and continuously adjusts the angular position of the lamp as a function of the image data while the controller detects the vehicle from the image data, so that the emitted light from the lamp stays directed toward the vehicle.

19. The motorcycle of claim 12,
the controller analyzes the image data with a convolutional neural network machine-learned image recognition algorithm to detect the vehicle and location of the vehicle relative to the motorcycle.

20. A motorcycle comprising:
a lighting system comprising (i) a rearward-right lamp configured to illuminate a rearward-right region that is rearward and to the right of the motorcycle, and (ii) a rearward-left lamp configured to illuminate a rearward-left region that is rearward and to the left of the motorcycle;
a rearward imaging assembly with a field of view that is generally rearward of the motorcycle, the rearward imaging assembly comprising an image sensor configured to generate image data; and
a controller in communication with the rearward-right lamp and the rearward-left lamp, the controller configured (i) to receive as input the image data that the image sensor of the rearward imaging assembly generates, (ii) to analyze the image data, (iii) to detect a vehicle from the image data, and (iv) to activate whichever of the rearward-right lamp and the rearward-left lamp that illuminates whichever of the rearward-right region and the rearward-left region that is closest to the vehicle to provide a visual warning to the vehicle.

* * * * *

UNITED STATES PATENT AND TRADEMARK OFFICE
CERTIFICATE OF CORRECTION

PATENT NO. : 11,518,465 B2
APPLICATION NO. : 16/826671
DATED : December 6, 2022
INVENTOR(S) : George A. Neuman et al.

It is certified that error appears in the above-identified patent and that said Letters Patent is hereby corrected as shown below:

In the Claims

Column 17, Claim 7, Line 17, after "lamps" insert --further--; and

Column 17, Claim 7, Line 23, after "lamps" insert --further--.

Signed and Sealed this
Sixteenth Day of April, 2024

Katherine Kelly Vidal
*Director of the United States Patent and Trademark Office*